US007813698B2

(12) United States Patent
Seshadri et al.

(10) Patent No.: US 7,813,698 B2
(45) Date of Patent: *Oct. 12, 2010

(54) MODULAR WIRELESS MULTIMEDIA DEVICE

(75) Inventors: Nambirajan Seshadri, Irvine, CA (US); James D. Bennett, Hroznetin (CZ); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 12/354,700

(22) Filed: Jan. 15, 2009

(65) Prior Publication Data

US 2009/0124202 A1 May 14, 2009

Related U.S. Application Data (63) Continuation of application No. 10/976,300, filed on Oct. 27, 2004, now abandoned, which is a continuation-in-part of application No. 10/856,124, filed on May 28, 2004, now abandoned, which is a continuation-in-part of application No. 10/856,430, filed on May 28, 2004, now abandoned.

(60) Provisional application No. 60/473,675, filed on May 28, 2003, provisional application No. 60/473,967, filed on May 28, 2003.

(51) Int. Cl.
*H04B 7/00* (2006.01)

(52) U.S. Cl. ............... 455/41.2; 455/575.2; 455/575.6; 455/3.06; 455/569.2; 455/569.1; 455/572; 455/575.1; 455/3.05; 455/566; 455/419; 381/74; 381/23.1; 381/370; 381/357; 381/185; 381/315; 381/312; 381/374; 379/430; 379/431; 379/114.01; 379/428.02; 379/433.01

(58) Field of Classification Search ................ 455/41.2, 455/575.2, 575.6, 3.06, 569.2, 569.1, 572, 455/575.1, 3.05, 556.1, 419; 381/74, 23.1, 381/370, 375, 185, 315, 312, 374; 379/430, 379/431, 114.01, 428.02, 433.01
See application file for complete search history.

(56) References Cited

U.S. PATENT DOCUMENTS 5,177,784 A * 1/1993 Hu et al. ..................... 379/430

(Continued)

FOREIGN PATENT DOCUMENTS

| DE | 19645259 A1 | 5/1998 |
|---|---|---|
| DE | 10114109 A1 | 9/2002 |
| EP | 1213896 A1 | 6/2002 |
| WO | WO 02/17564 | 2/2002 |

OTHER PUBLICATIONS

European Search Report dated Jun. 17, 2010; EP Application No. 04012807.6-1246.

*Primary Examiner*—Matthew D Anderson
*Assistant Examiner*—April G Gonzales
(74) *Attorney, Agent, or Firm*—Garlick Harrison & Markison (57) ABSTRACT

A modular wireless headset includes wearable earpiece(s) and wearable microphone(s), where the earpiece and microphone may be physically separate devices. The wearable earpiece renders inbound radio frequencies received from a host device audible. The wearable earpiece may include a receiver module, data recovery module, and speaker module. The receiver module may convert inbound RF signals into low intermediate frequency (IF) signals. The data recovery module recovers audio signals from the low IF signals. The speaker module renders the audio signals audible. The wearable microphone converts received audio signals into outbound RF signals, where the outbound RF signals are transmitted to the host device. The wearable microphone includes an audio input module and a transmitter module. The audio input module is operably coupled to convert received analog audio signals into digital audio signals. The transmitter module is operably coupled to convert the digital audio signals into the outbound RF signals.

17 Claims, 12 Drawing Sheets

U.S. PATENT DOCUMENTS

| | | | |
|---|---|---|---|
| 5,479,522 A * | 12/1995 | Lindemann et al. | 381/23.1 |
| 5,590,417 A * | 12/1996 | Rydbeck | 455/575.2 |
| 6,078,825 A * | 6/2000 | Hahn et al. | 455/569.2 |
| 6,230,029 B1 * | 5/2001 | Hahn et al. | 455/575.2 |
| 6,269,259 B1 * | 7/2001 | Lai | 455/569.1 |
| 6,424,820 B1 | 7/2002 | Burdick et al. | |
| 6,473,630 B1 * | 10/2002 | Baranowski et al. | 455/572 |
| 6,760,458 B1 * | 7/2004 | Bogeskov-Jensen et al. | 381/370 |
| 6,885,848 B2 * | 4/2005 | Lee | 455/41.2 |
| 7,120,476 B2 * | 10/2006 | Yoo | 455/575.1 |
| 7,142,814 B2 * | 11/2006 | Nassimi | 455/41.2 |
| 7,305,258 B2 * | 12/2007 | Rydgren et al. | 455/573 |
| 7,477,922 B2 * | 1/2009 | Lewis | 455/569.1 |
| 7,603,148 B2 * | 10/2009 | Michalak | 455/575.2 |
| 2002/0039424 A1 * | 4/2002 | Watanuki | 381/74 |
| 2002/0058536 A1 * | 5/2002 | Horii et al. | 455/566 |
| 2002/0061744 A1 * | 5/2002 | Hamalainen et al. | 455/426 |
| 2002/0196955 A1 | 12/2002 | Boesen et al. | |
| 2004/0137967 A1 * | 7/2004 | Bodley | 455/575.2 |
| 2004/0204120 A1 * | 10/2004 | Jiles | 455/564 |
| 2005/0009583 A1 * | 1/2005 | Cheung et al. | 455/575.6 |
| 2005/0026560 A1 * | 2/2005 | Villaverde et al. | 455/3.06 |
| 2006/0111044 A1 * | 5/2006 | Keller | 455/41.2 |

* cited by examiner

MODULAR WIRELESS MULTIMEDIA DEVICE

CROSS REFERENCES TO RELATED APPLICATIONS

This Application is a continuation of and claims priority pursuant to 35 U.S.C. §120 to U.S. patent application having an application Ser. No. 10/976,300, filed Oct. 27, 2004, which is incorporated herein by reference in its entirety. The application Ser. No. 10/976,300 is a continuation-in-part of application Ser. No. 10/856,124, filed May 28, 2004, which claims priority under 35 USC §119(e) to provisional application No. 60/473,675, filed on May 28, 2003, both of which are incorporated herein by reference in their entirety. The application Ser. No. 10/976,300 is also a continuation-in-part of application Ser. No. 10/856,430, filed May 28, 2004, which claims priority under 35 USC §119(e) to provisional application No. 60/473,967, filed on May 28, 2003, both of which are incorporated herein by reference in their entirety.

BACKGROUND OF THE INVENTION

1. Field of the Invention

This invention generally to wireless communications and more particularly to modular wireless headset and/or headphone and communications associated therewith.

2. Background of the Invention

Wireless communications offer users the ability to be "wired" from almost anywhere in the world. Cellular telephones, satellite telephones, wireless local area networks, personal digital assistants (PDAs) with radio frequency (RF) interfaces, laptop computers with RF interfaces and other such devices enable these wireless communications. Such wireless communications have been extended to personal wireless networks, such as these defined by the Bluetooth specification. One popular use of personal wireless networks couples a wireless headset(s) with cellular telephone(s), personal computer(s), and laptop(s), etc. The Bluetooth specification provides specific guidelines for providing such wireless headset functionality.

In particular, Bluetooth provides a headset profile that defines protocols and procedures for implementing a wireless headset to a device private network. Once configured, the headset functions as the device's audio input and output. As further defined by the Bluetooth specification, the headset must be able to send AT (Attention) commands and receive resulting codes, such that the headset can initiate and terminate calls. The Bluetooth specification also defines certain headset profile restrictions. These restrictions include an assumption that the ultimate headset is assumed to be the only use case active between the two devices. The transmission of audio is based on continuously variable slope delta (CVSD) modulation. The result is a monophonic audio of a quality that normally will not have perceived audio degradation. Only one audio connection at a time is supported between the headset and audio gateway. The audio gateway controls the synchronous connection orientated (SCO) link establishment and release. The headset directly connects and disconnects the internal audio stream upon SCO link establishment and release. Once the link is established, valid speech exists on the SCO link in both directions. The headset profile offers only basic inoperability such that the handling of multiple calls at the audio gateway is not supported. It is assumed that the headset user interface can detect user initiated action, such as the pressing of a button.

While a wireless headset provides cord-free operation between the headset and the host device (i.e., the audio gateway), there still must be a physical connectivity between the earpiece and microphone of the headset. This direct connectivity limits the physical structure that could be used for a wireless headset and, in many cases, results in headsets that are cumbersome to use and uncomfortable to wear.

Therefore, a need exists for a method and apparatus for a modular headset that is less cumbersome, more discrete, and more comfortable to wear.

BRIEF SUMMARY OF THE INVENTION

The present invention is directed to apparatus and methods of operation that are further described in the following Brief Description of the Drawings, the Detailed Description of the Invention, and the Claims. Other features and advantages of the present invention will become apparent from the following detailed description of the invention made with reference to the accompanying drawings.

DETAILED DESCRIPTION OF THE INVENTION

Figure 1:
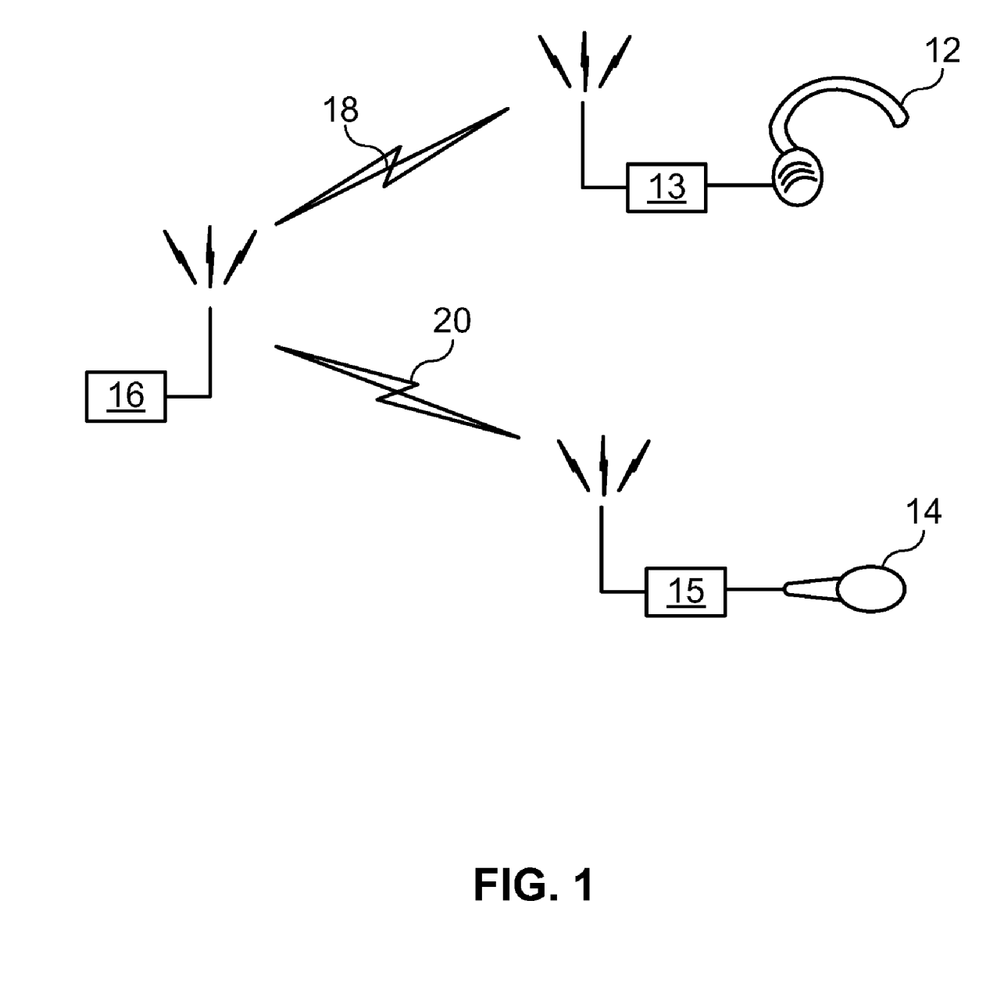
FIG. 1 is a diagram of a modular wireless headset in accordance with the present invention.

FIG. 1 is a diagram of a modular wireless headset 10 that includes a wearable earpiece 12 and a wearable microphone 14. Wearable earpiece 12 may be a separate physical device from wearable microphone 14. Accordingly, wearable earpiece 12 and wearable microphone 14 are separate communication devices that may individually communicate with host device 16 via separate communication pathways. As shown, wearable earpiece 12 may communicate with host device 16, which may be a cellular telephone, wire line telephone, laptop computer, personal computer, personal digital assistant, etc, using transceiver (or receiver) 13 via a first communication pathway 18. Host device 16 is operable to establish a wireless pathway to earpiece 12 or microphone 14. The wearable microphone 14 may communicate with the host device 16 using transceiver (or transmitter) 15 via a second communication pathway 20.

If the first and second communication pathways 18 and 20 are established in accordance with the Bluetooth specification, communication resources 18 and 20 may be different timeslot allocations on the same synchronous connection orientated (SCO) link, or may be separate SCO links. Configuration and construction details of wearable earpiece 12 and wearable microphone 14 will be described in greater detail with reference to FIGS. 4-12.

Figure 2:
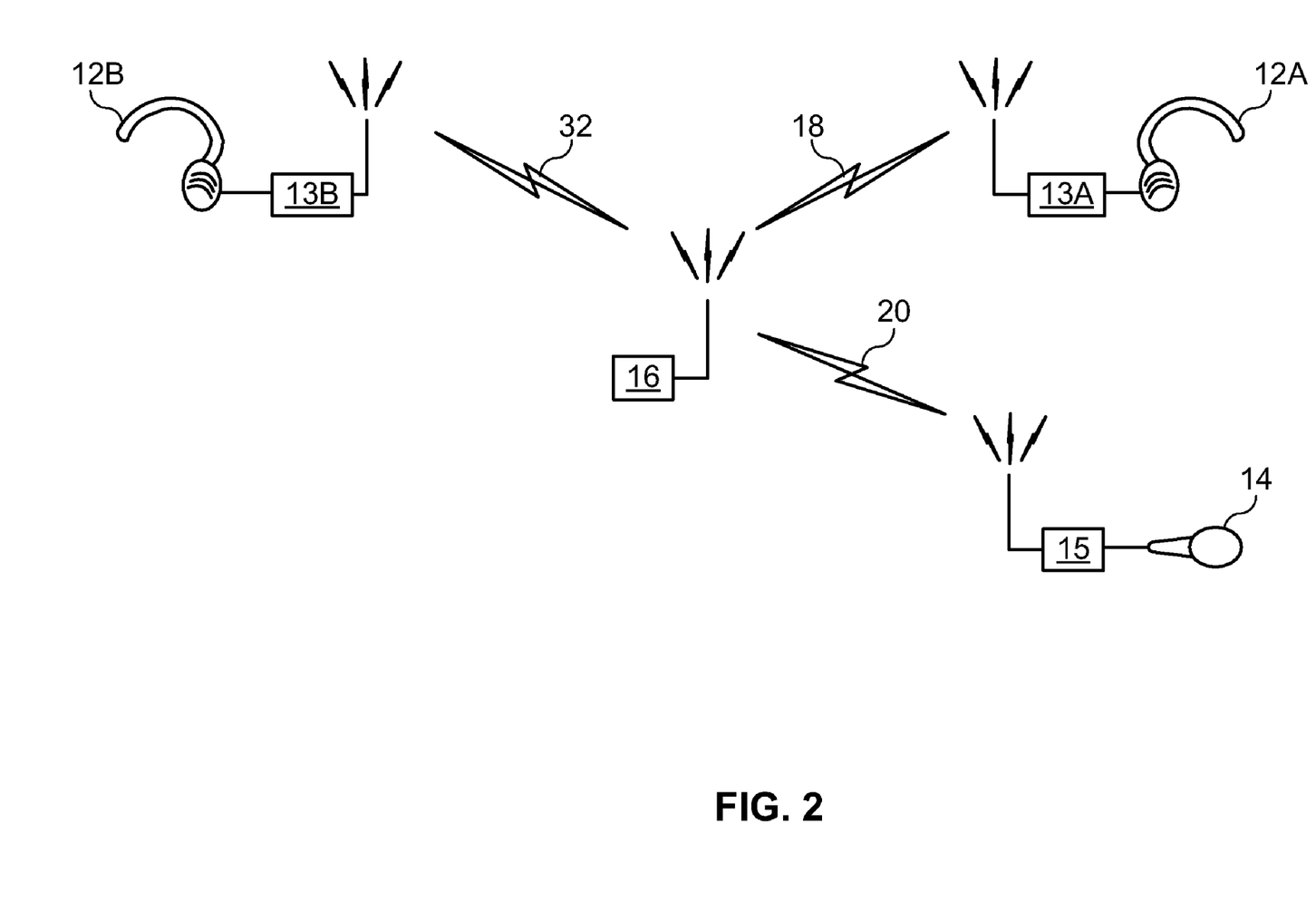
FIG. 2 is a diagram of another modular wireless headset in accordance with the present invention.

FIG. 2 is a diagram of another embodiment of modular wireless headset 30 that includes two wearable earpieces 12A and 12B, and wearable microphone 14. In this configuration, microphone 14 communicates with host device 16 via communication pathway 20, wearable earpiece 12A communicates with host device 16 using transceiver (or receiver) 13A via communication pathway 18 and wearable earpiece 12B communicates with host device 16 using transceiver (or receiver) 13B via communication pathway 32.

In operation, voice produced by the individual wearing microphone 14 is received via microphone 34 and converted into RF signals by circuitry within wearable microphone 14. These RF signals are provided to host device 16 via communication pathway 20. Host device 16 includes a corresponding receiver antenna 34 and receiver module 36 to recapture the audio signals received via communication pathways 18, 20 and 32. These items will be further discussed in FIG. 3. In addition, host device 16 includes at least one transmitter 38 to transmit audio information to the wearable earpiece(s) 12A and 12B. In one embodiment, host device 16 may transmit left channel stereo information to wearable earpiece 12 and right channel stereo information to wearable earpiece 12B.

A wireless headphone may be realized by omitting wearable microphone 14 and including either one or both of wearable earpieces 12A and 12B. In this embodiment, host device may be a playback device such as a CD player, DVD player, cassette player, etc. operable to stream audio information.

Figure 3:
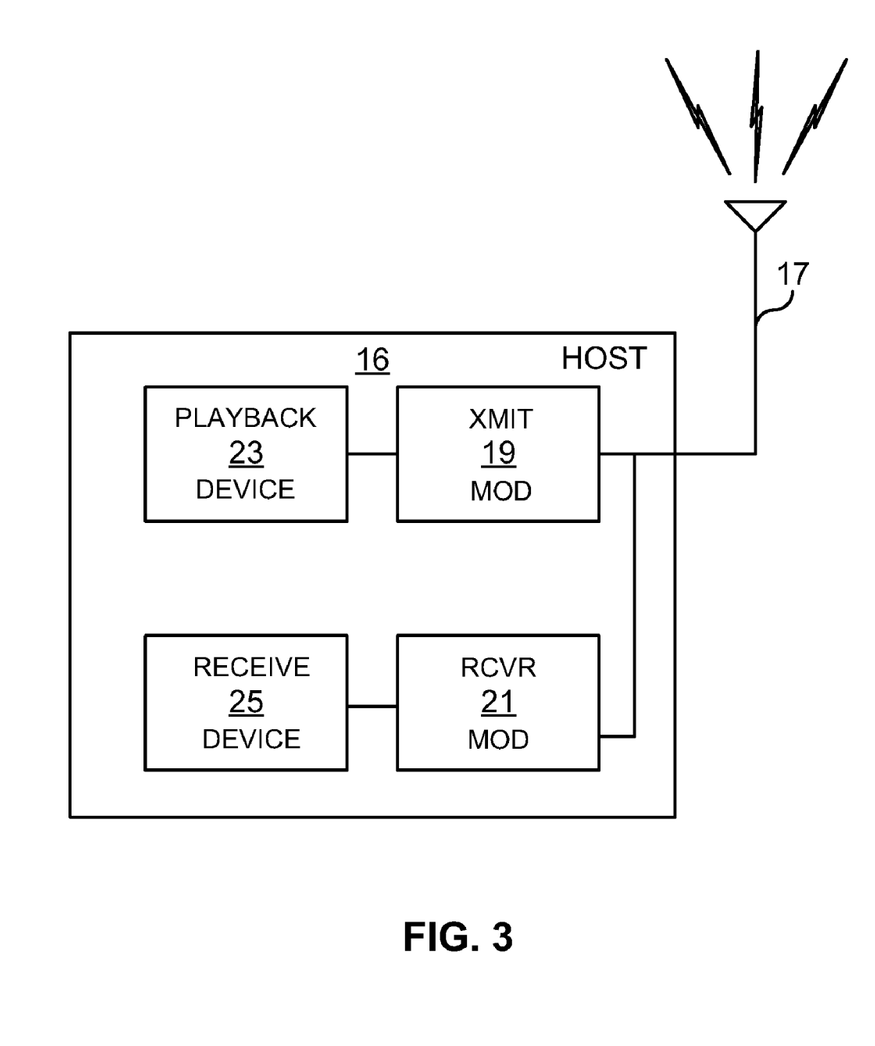
FIG. 3 is a schematic block diagram of an access point in accordance with the present invention.

FIG. 3 is a diagram of host device that supports modular wireless headset 30. Host device 16 includes a combination of transmitter and receiver (or transceiver) modules that accept and modulate or demodulate streamed audio to and from earpiece(s) 12 and microphone 14 through antenna 17. The host device may be incorporated within or operably couple to another device such as a playback device, laptop, cellular telephone, land based telephone or other like device known to those skilled in the art. For example, one embodiment has transmitter module 19 and receiver module 21. Transmitter module 19 accepts unmodulated streamed audio from playback type device 23 (e.g., DVD player, MP3 player, CD player, cassette player, or other like devices known to those skilled in the art.). Transmitter module 19 then modulates the streamed audio into low intermediate frequency (IF) signal 70. In the case where two earpieces are employed, multiple transmitter modules may be employed to modulate the streamed audio into low IF signals for the earpieces for each channel (i.e. left and right channels of stereo transmissions. Similarly, receiver module 21 accepts modulated streamed audio from wearable microphone 14. Receiver module 21 recovers audio signals from the received low IF signals. The recovered audio signals are then relayed to receiving device 25. Note that the generation of low IF signals and subsequent demodulation to recapture audio signal may be done in accordance with a particular wireless communication standard. For example, the Bluetooth specification may be used, IEEE802.11 (a), (b), and/or (g) may also be used, etc.

Figure 4:
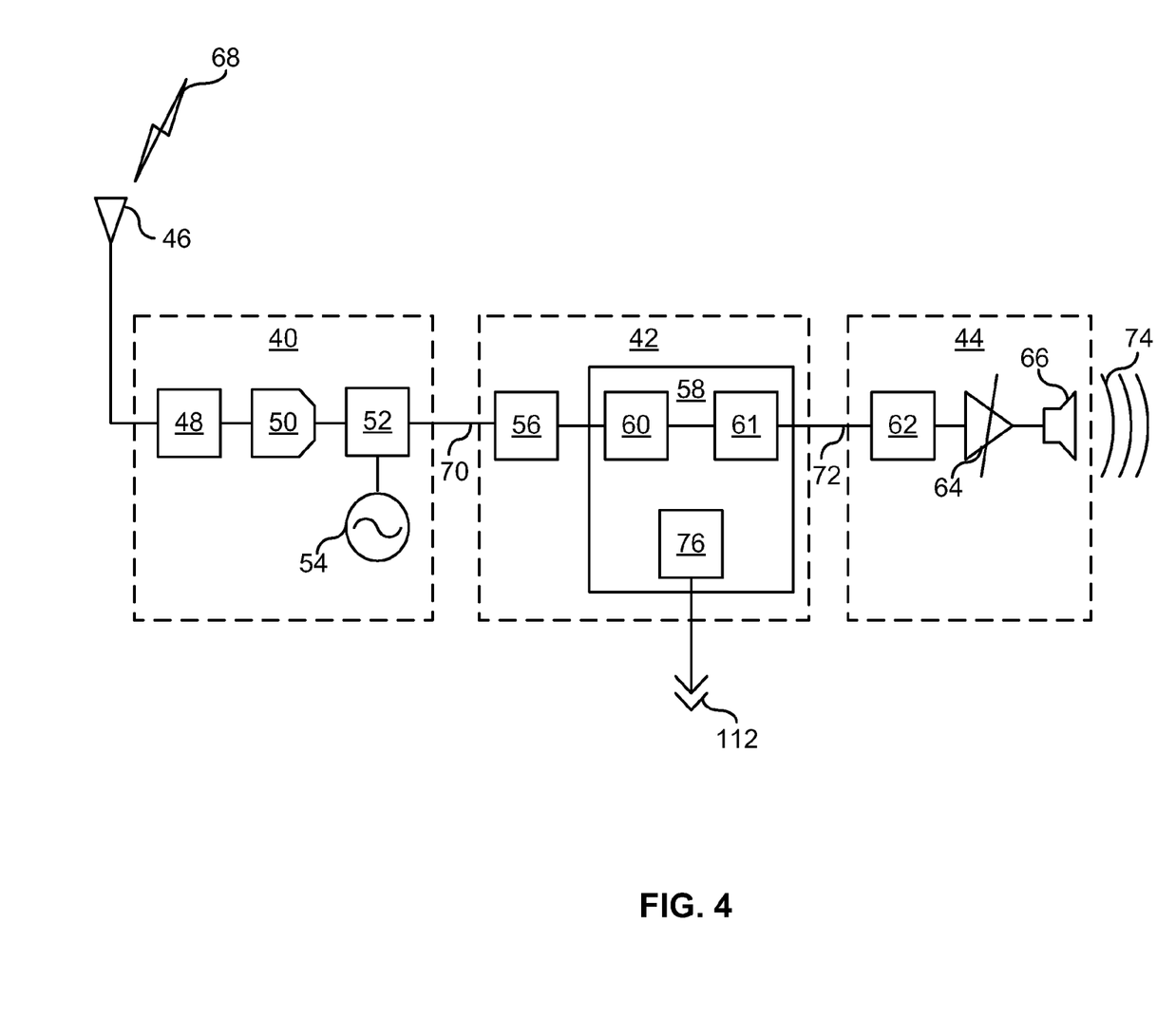
FIG. 4 is a schematic block diagram of a wearable earpiece in accordance with the present invention.

FIG. 4 is a schematic block diagram of wearable earpiece 12. Wearable earpiece 12 includes receiver module 40, data recovery module 42 and speaker module 44. One embodiment of receiver module 40 includes antenna 46, bandpass filter 48, low noise amplifier 50, down converter 52 and local oscillator 54. Data recovery module 42 may include an analog-to-digital converter (ADC) 56 and processing module 58. Processing module 58, which may have associated memory, is configured to provide digital channel filter 60, demodulator 61 and setup module 76. Speaker module 44 includes a digital-to-analog converter (DAC) 62, variable gain module 64, and at least one speaker 66.

Once the piconet is configured (which will be described subsequently), receiver module 40 receives inbound RF signal 68 from host device 16 via antenna 46. Bandpass filter 48 filters the received RF signal 68 which are subsequently amplified by low noise amplifier 50. Down converter 52 converts the filtered and gained RF signal 68 into low intermediate frequency (IF) signal 70 based on a local oscillator 54. Low IF signals 70 may have a carrier frequency at DC ranging to a few megahertz.

Data recovery module 42 receives low IF signals 70 and converts the low IF signals 70 into digital signals via ADC 56. Processing module 58 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory (not shown) may be a single memory device or a plurality of memory devices. Such a memory device may be a read-only memory, random access memory, volatile memory, non-volatile memory, static memory, dynamic memory, flash memory, and/or any device that stores digital information. Note that when processing module 58 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Digital channel filter 60 receives the digital low IF signals 72 and filters these signals. Demodulator 61 recovers audio signals 74 from the filtered low IF signals. Note that the generation of RF signal 68 and subsequent demodulation to recapture audio signal 74 may be done in accordance with a particular wireless communication standard. For example, the Bluetooth specification may be used; IEEE802.11 (a), (b), and/or (g) may also be used, etc.

Speaker module 44 converts digital audio signal 74 into analog signals provided to the user through speakers 66. Adjustable gain module 64 adjusts the gain (i.e., adjusts volume), and provides the gained signals to speaker 66, which produces audible signals 74. As long as the piconet remains in place between wearable earpiece 12 and host device 16, wearable earpiece 12 will produce audible signals 74 from received inbound RF signal 68.

Figure 5:
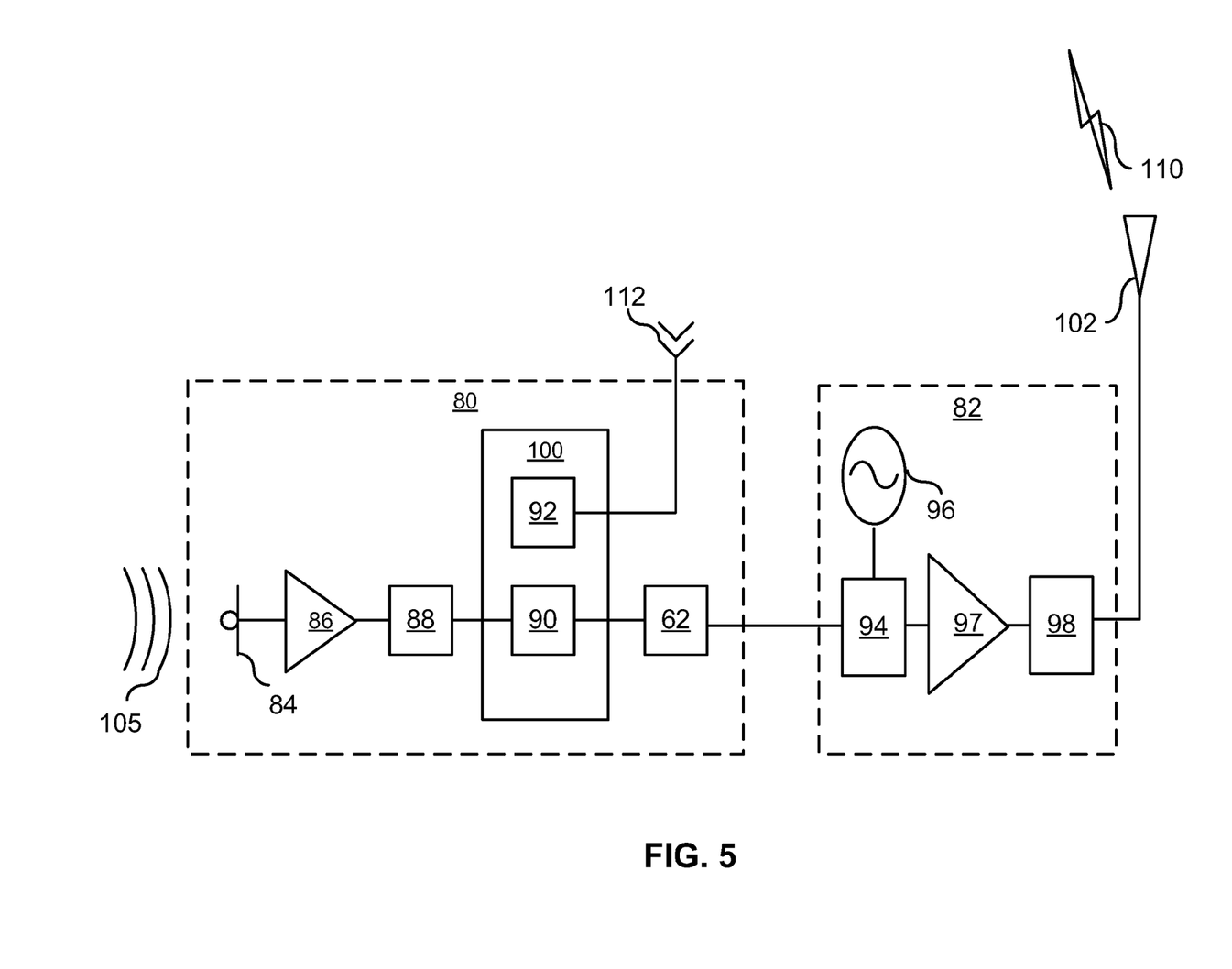
FIG. 5 is a schematic block diagram of a wearable microphone in accordance with the present invention.

FIG. 5 is a schematic block diagram of wearable microphone 14 that includes audio input module 80 and transmitter module 82. Audio input module 80 includes microphone 84, amplifier 86, ADC 88, processing module 100 that is configured to provide a setup module 92 and modulator 90, and DAC 62. Transmitter module 82 includes up-converter 94, local oscillator 96, power amplifier 97, bandpass filter 98, and antenna 102.

Once wearable microphone 14 is configured within a piconet, microphone 84 is operably coupled to receive audio signals 105 and convert these signals to analog signals 106. Amplifier 86 amplifies analog audio signals 106 to produce amplified signals. ADC 88 then converts the amplified signals into digital audio signals 108. Modulator 90 modulates the digital signals based on a communication standard into modulated signals. As shown, modulator 90 and setup module 92 are implemented within processing module 100. Processing module 100 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Up-converter 94 converts modulated signals 110 into RF signals based on local oscillator 96. Power amplifier 97 amplifies these signals which may be subsequently bandpass filter 98. The filtered RF signals are then transmitted via antenna 102 as outbound RF signals 110 to host device 16. As long as the piconet is established to include wearable microphone 14 and host device 16, wearable microphone 14 will transmit to host device 16 in the manner just described.

As shown in both FIGS. 4 and 5, separable connector 112 may couple setup modules 76 and 92. Such a physical connection allows for wearable earpiece 12 and wearable microphone 14 to communicate in both directions with the host device to establish the piconet. For example, if the devices are compliant with one or more versions of the Bluetooth specification, host device 16, functioning as the master, may issue a piconet request to wearable earpiece 12 coupled to wearable microphone 14. Upon receiving this request, wearable earpiece 12 and wearable microphone 14 respond to the request indicating that a receive RF channel (communication pathway 18) be setup for the wearable earpiece and a transmit RF channel (communication pathway 20) be setup for wearable microphone 14. Based on these responses, the master coordinates the establishment of the piconet and provides synchronization information through wearable earpiece 12 and wearable microphone 14 via receiver module 40 of earpiece 12. Setup modules 76 and 92 coordinate the synchronization of earpiece 12 and microphone 14 with the host device, as well as coordinating timeslot assignments and/or SCO link assignments. Once the piconet has been established in this manner, the connection between wearable earpiece 12 and wearable microphone may be secured to establish the wearable earpiece 12 and wearable microphone 14 as separate pieces.

As an alternative setup mode, wearable earpiece 12, wearable microphone 14 may be directly coupled to the host device. The direct coupling may be used to establish the piconet and exchange synchronization information, timeslot allocation information, etc. Once the information has been exchanged in this manner, the connections may be broken such that wearable earpiece 12, wearable microphone 14 and host device 16 are physically separate devices.

Figure 6:
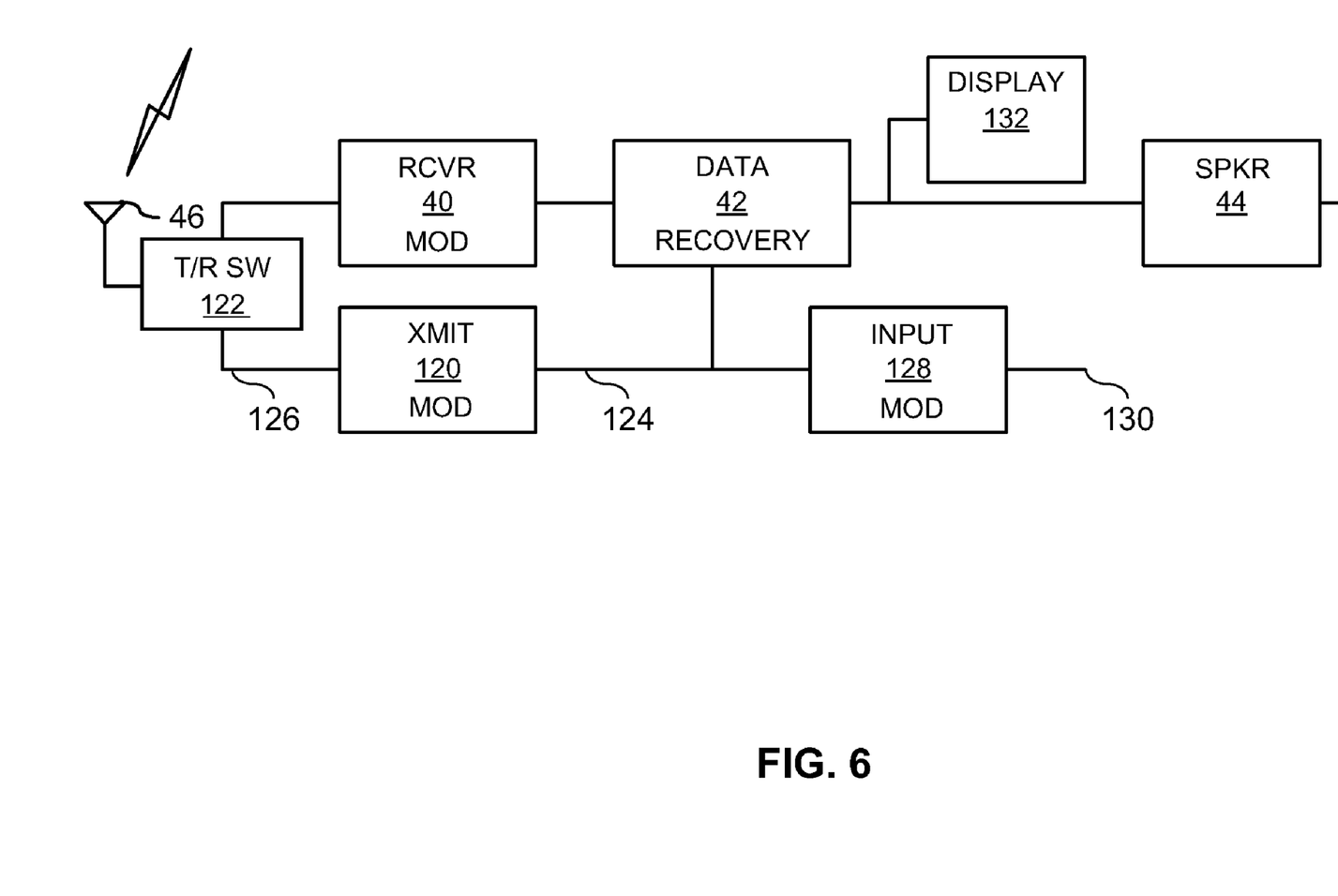
FIG. 6 is a schematic block diagram of an alternate wearable earpiece in accordance with the present invention.
Figure 7:
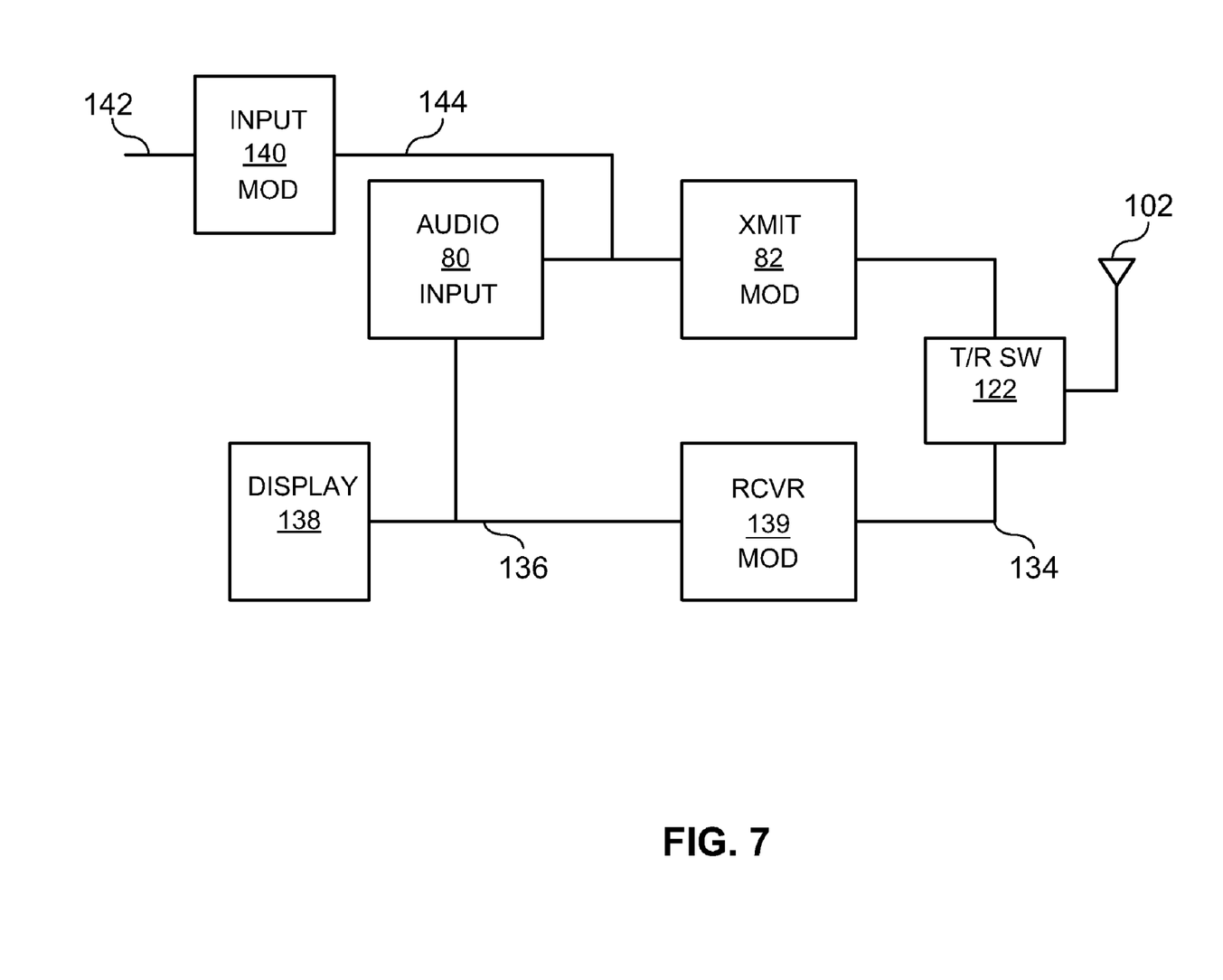
FIG. 7 is a schematic block diagram of another wearable microphone in accordance with the present invention.

FIGS. 6 and 7 illustrate schematic block diagrams of wearable earpiece 12 and wearable microphone 14 that include transceiver modules (i.e., receiver modules and transmitter modules). The use of the transceiver modules allow wearable earpiece 12, wearable microphone 14 and host device 16 to be physically separate devices and be configured using the piconet's RF communications. As such, wearable earpiece 12 and wearable microphone 14 may be continuously worn on a person for receiving incoming calls and/or placing outgoing calls.

Wearable earpiece 12, as shown in FIG. 5, includes antenna 46, transmit/receive switch 122, receiver module 40, data recovery module 42, speaker module 44, transmitter module 120, input module 128 and display module 132. Receiver module 40, data recovery module 42 and speaker module 44 operate as discussed with reference to FIG. 4, with the exception of the data recovery module 42, to produce display information that is provided to display module 132. For instance, the received RF signal may include display information such as caller ID, command information, etc. which is separated by data recovery module 42 and provided to display module 132, which may be an LCD display, plasma display, etc.

Input module 128, which may be a keypad, touch screen, voice recognition circuit, or other like user interfaces, receives user commands and produces digital command messages 124 there from. Such digital command messages 124 includes, but are not limited to, packet size, synchronization information, frequency hopping initiation information, timeslot allocation information, link establishment information, piconet address information, fast-forward, play, pause, volume adjust, record, stop and rewind.

Data recovery module 42 receives digital command messages 124 and, when applicable, processes the command messages. For example, if the command message is with respect to a volume adjust; a graphical representation of adjusting the volume may be presented on display module 132 and the gain of amplifier 64 adjusted to adjust the volume associated with speaker 66.

Transmit module 120 receives digital command messages 124 and converts these messages into outbound RF command signals 126, which are subsequently transmitted to host device 16 and/or microphone module via antenna 46. Accordingly, by including transmitter module 120 along with receiver module 40, wearable earpiece 12 may function as a master and/or slave within the piconet and exchange data with the other elements within the piconet.

FIG. 7 is a schematic block diagram of wearable microphone 14 that includes audio input module 80, transmitter module 82, transmit receive switch 122, antenna 102, receiver module 139, input module 140 and display module 138. Input module 140 is operable to receive user input commands 142 and convert these commands into digital command messages 144. Digital command messages 144 may be similar to digital command messages 124 and may further include establish a call, terminate a call, call waiting, or other like functions. Transmitter module 82 converts digital command messages 144 into RF command signals 134 that are transmitted via antenna 102. Similarly, inbound RF command signals 135 may be received by receiver module 139 via antenna 102. Display module 138, which may be a LCD display, plasma display, etc., receives digital command messages 136 and may display corresponding configuration messages. In addition, any display information received from the host and/or microphone module regarding setup, operation, or as part of the data content, may be displayed on display module 138.

Figure 8:
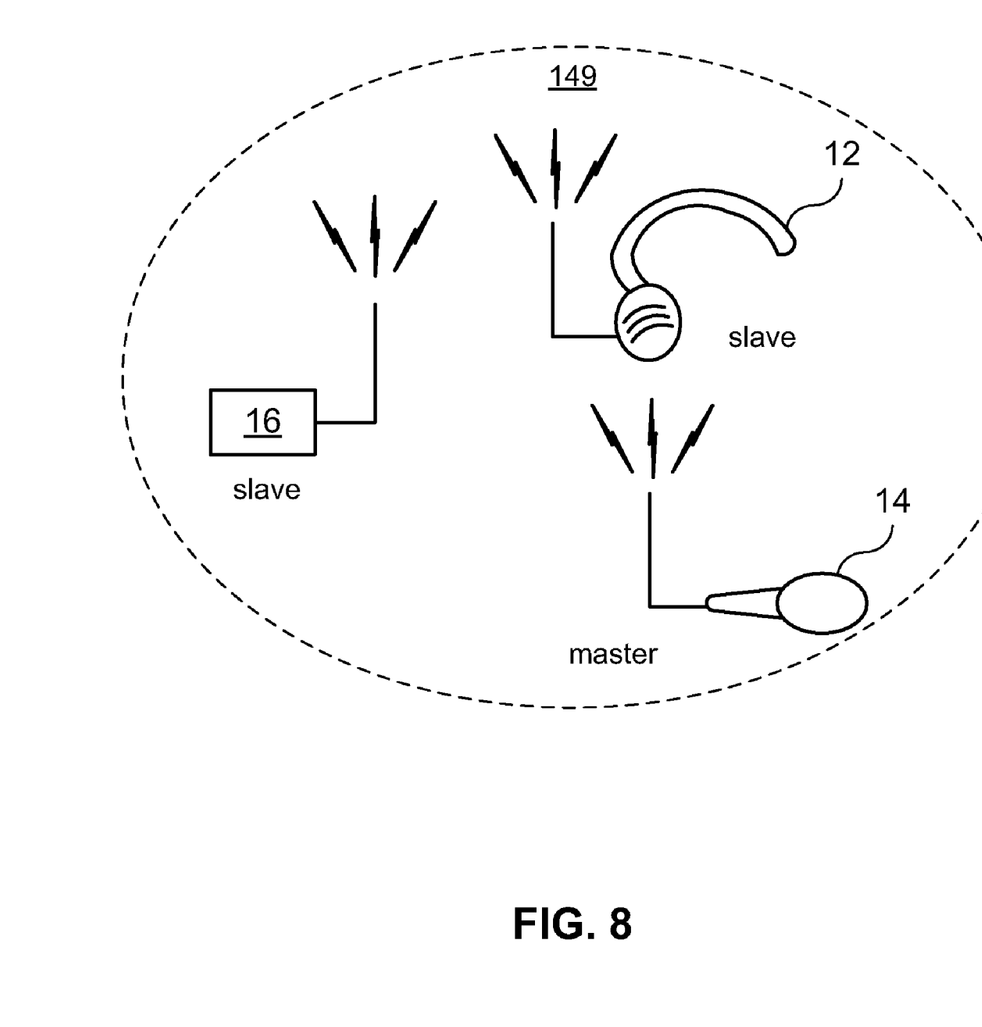
FIGS. 8-10 are graphic representations of various piconets that include a modular wireless headset and host device in accordance with the present invention.
Figure 9:
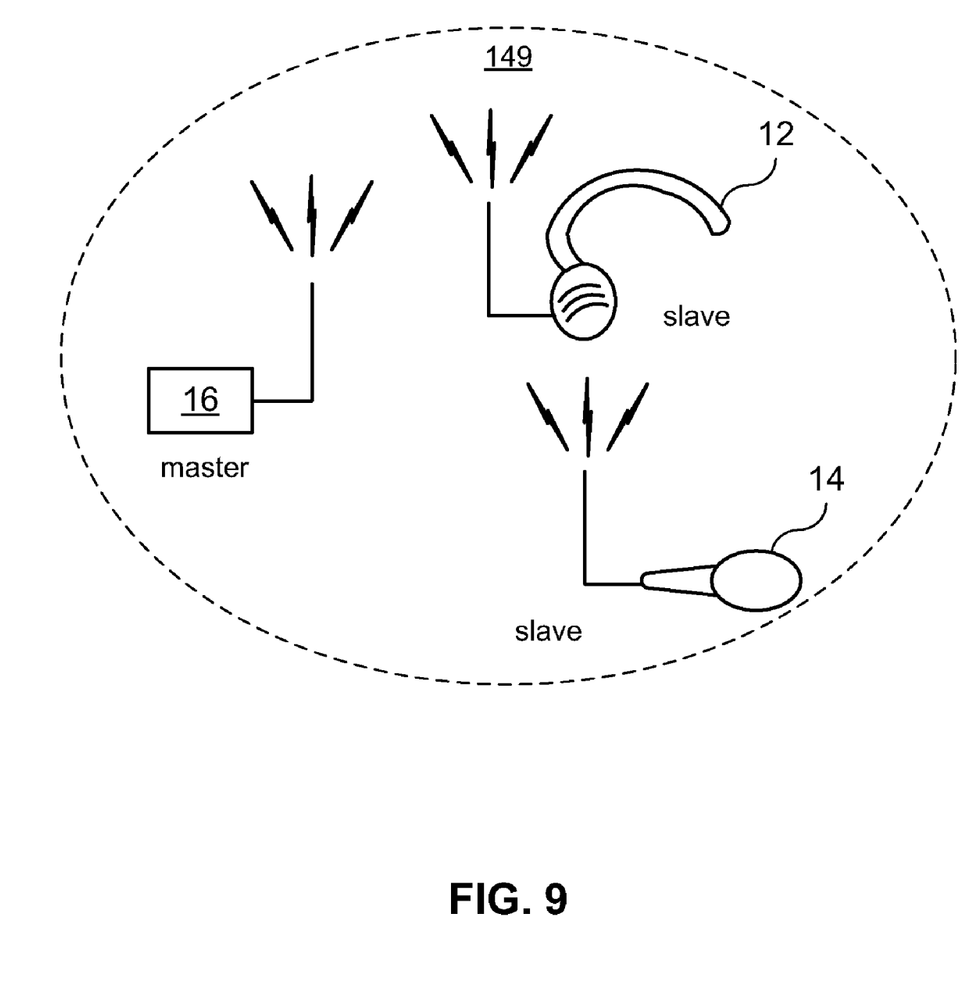
Figure 10:
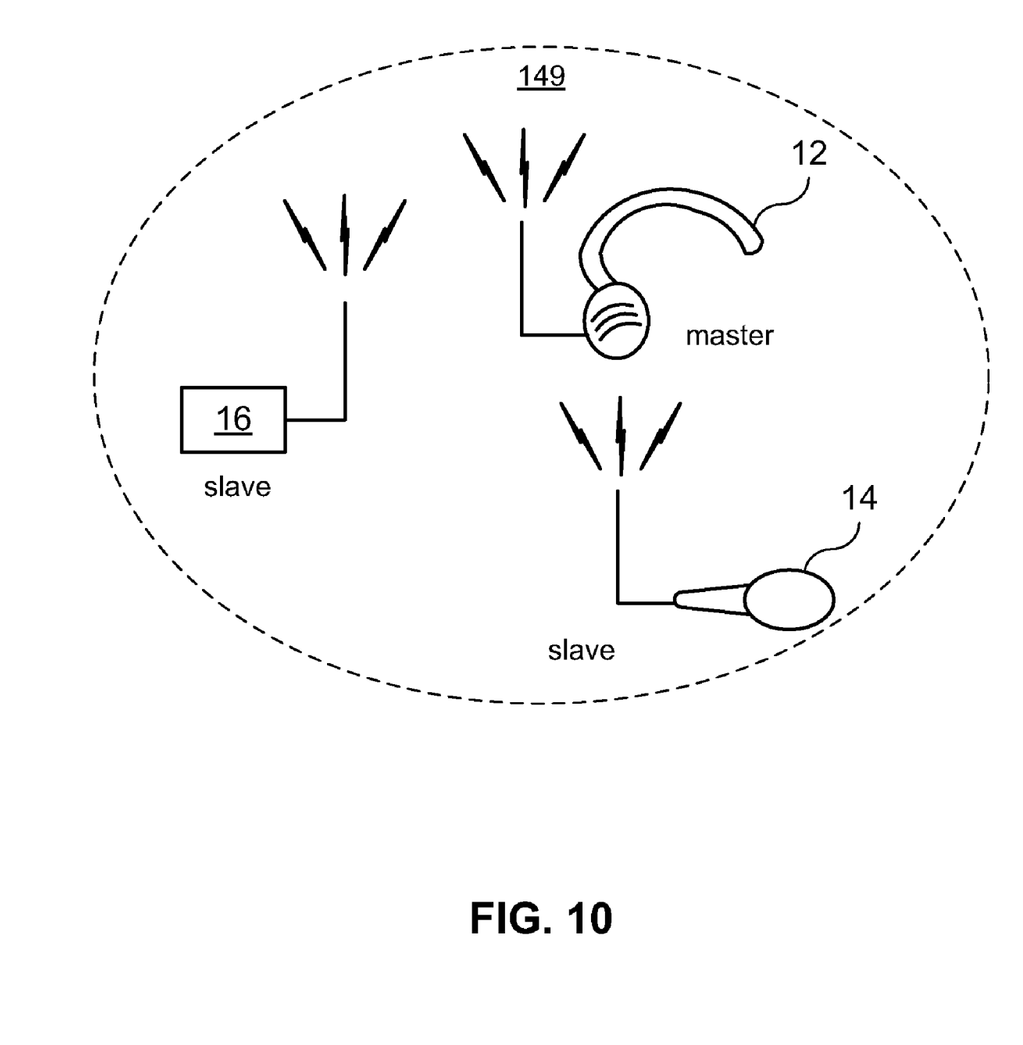

FIGS. 8-10 illustrate various configurations for piconet 149. In FIGS. 8-10, the piconet includes host device 16, wearable earpiece 12 and wearable microphone 14. In FIG. 8, wearable microphone 14 functions as the master such that, as the master, wearable microphone 14 establishes and breakdowns the piconet, provides synchronization information and perform timeslot allocations and/or establish multiple SCO links with host device 16 and wearable earpiece 12. In FIG. 9, host device 16 has master responsibilities, whereas in FIG. 10, wearable earpiece 12 has master responsibilities. As such, by configuring wearable earpiece 12 and wearable microphone 14, as discussed in FIGS. 6 and 7, wearable earpiece 12 and wearable microphone 14 may be completely physically separate devices from each other and from the host device. Alternatively, as discussed with reference to FIGS. 4 and 5, the wearable earpiece and wearable microphone may be physically coupled to establish piconet 140. Once piconet 140 is established, the devices may be physically separated and communicate with host device 16 via separate RF communication pathways as shown in FIGS. 1 and 2.

Figure 11:
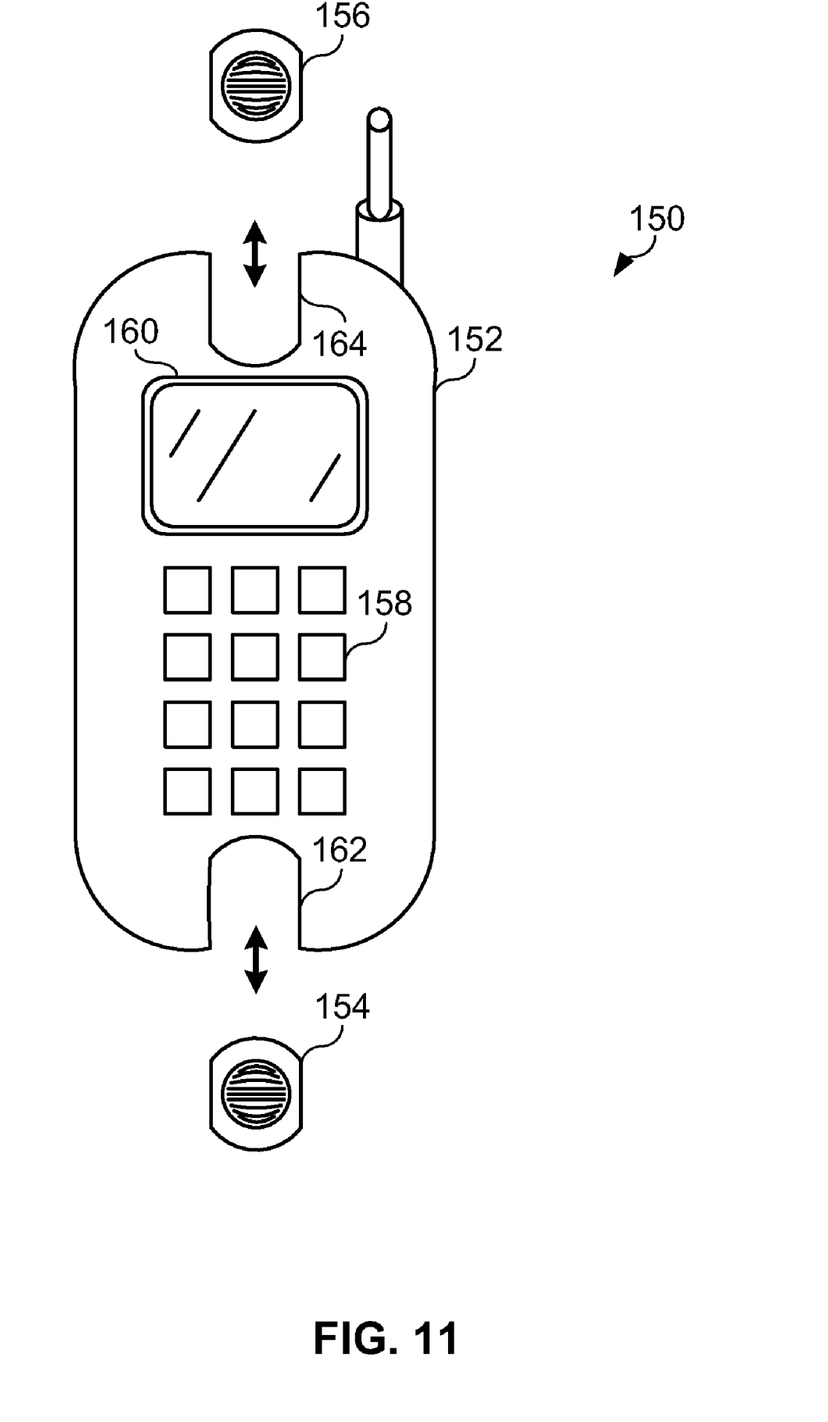
FIG. 11 is a diagram of a modular communication device in accordance with the present invention.

FIG. 11 is a schematic block diagram of modular communication device 150, such as a wireless terminal (e.g., cell phone) that includes host module 152, detachable microphone 154 and detachable earpiece 156. In this embodiment, modular communication device 150 may function as a typical device (e.g., cellular telephone, CD player, cassette player, etc.) when detachable earpiece 156 and detachable microphone 154 are physically connected to host module 152. The detachable earpiece may be configured as shown in FIG. 4 or 6, and the detachable microphone may be configured as shown in FIG. 5 or 7. As such, when detachable earpiece 156 is not in physical contact with host module 152, a wireless connection couples detachable earpiece 156 and host module 152. Similarly, when detachable microphone 154 is detached from host module 152, a second wireless connection couples detachable microphone 154 and host module 152. Alternatively, when detachable earpiece 156 and/or detachable microphone 154 are physically coupled to host module 152, they may communicate via a physical or wireless link. As one of average skill in the art will appreciate, modular communication device 150 may include multiple detachable earpieces 156. In addition, modular communication device 150 may omit detachable microphone 154 if host device 152 is a playback type device (e.g., DVD player, CD player, cassette player, etc.). Similarly, modular communication device 150 may omit detachable earpiece 156 when functioning as a recording device (e.g., dictaphone). Detachable ear-piece 156 and microphone 154 may have on-chip operations to support call conferencing, call waiting, flash, and other features associated with telephones. These functions may me accessed and reviewed by a user interface 158 and display 160 within host device 152 or a user interface and display located on either detachable ear-piece 156 or microphone 154. The user interface and display, located on either the host device or detachable ear-piece 156 and microphone 154 may have a display and button(s) that may be used to program device, perform directory functions including selecting number to call, view caller ID, initiate call waiting, or initiate call conferencing. Additionally, circuitry within the ear-piece 156 and microphone 154 may enable voice activated dialing. The actual voice recognition could be performed within ear-piece 156, microphone 154, or host device 152. Thus, ear-piece 156 and microphone 154 may act to initiate calls and receive calls.

A link between ear-piece 156 and microphone 154 would allow ear-piece 156 and microphone 154 to share resources, such as batter life, and allow ear-piece 156 and microphone 154 to be recharged from host device 152. Ear-piece/microphone/base portion are included with cell phone battery. Cell phone battery has openings 162 and 164 located therein for storage/recharging of ear-piece 156 and microphone 154. When located in these openings, the ear-piece/microphone will be recharged from the cell phone battery. The new cell phone battery may include base portion RF interface and interface to cell phone port. Existing cell phone port technology could be used to treat the ear-piece/microphone in the same manner as wired ear-piece/microphone is treated.

Figure 12:
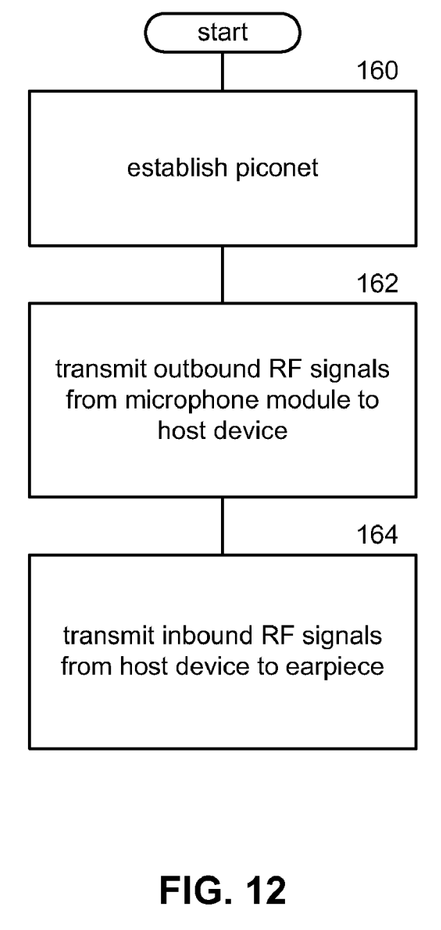
FIG. 12 is a logic diagram of a method for wireless communications within a piconet that includes a modular wireless headset and host device in accordance with the present invention.

FIG. 12 is a logic diagram of a method for wireless communications within a piconet that includes a modular wireless headset and a host device. The process begins at step 160 where the piconet is established to include the host device, the earpiece module and the microphone module. This may be done in a variety of ways. For instance, the piconet may be established by exchanging configuration information via a physical connection between the host device, the earpiece module and the microphone module prior to any RF transmissions there between. Based on the configuration information, the piconet is configured and the devices are separated. Once separated, RF communications may commence. Alternatively, the piconet may be established by exchanging configuration information via various wireless communication pathways that exist between the host device, the earpiece module and the microphone module prior to data content being transmitted via the communication resources. Once the configuration information is exchanged, the piconet is established and data content RF transmissions may commence.

The process then proceeds to step 162 where outbound RF signals are transmitted from the microphone module to the host device via a first wireless communication pathway of the piconet. Simultaneously or in a half-duplex mode, step 164 occurs where inbound RF signals are transmitted from the host device to the earpiece module via a second wireless communication resource of the piconet. The communication resources may be different timeslots on the same SCO link or different SCO links. The earpiece module may be configured to block or receive the outbound RF signals transmitted by the microphone module. Such a selection may be user controlled.

The preceding discussion has presented a modular communication device, modular wireless headset and modular wireless headphones. By physically separating the microphone from the earpiece and/or by separating the earpieces, more discrete components may be produced that are more comfortable to wear and are less cumbersome to use. As one of average skill in the art will appreciate, other embodiments may be derived from the teaching of the present invention without deviating from the scope of the claims.

What is claimed is:

1. An apparatus comprising:
  a mobile wireless transceiver to wirelessly communicate using a first communication link to send and receive signals at a radio frequency (RF), the mobile wireless transceiver including a receiver module to process inbound signals and a transmitter module to process outbound signals; and
  a wearable earpiece and microphone that are separate physical units, but attach to the mobile wireless transceiver, in which the wearable earpiece and microphone detach from the mobile wireless transceiver to wirelessly communicate with the mobile wireless transceiver using a second communication link, wherein the wearable earpiece and microphone each having a battery for wireless communications and each battery is recharged by the mobile wireless transceiver when the wearable earpiece and microphone are physically attached to the mobile wireless transceiver.

2. The apparatus of claim 1, wherein the wearable earpiece is comprised of multiple earpieces.

3. The apparatus of claim 1, wherein the wearable earpiece is a stereo headset.

4. The apparatus of claim 1, wherein the second communication link is a piconet.

5. The apparatus of claim 1, wherein the second communication link operates in accordance with one or more versions of a Bluetooth specification.

6. The apparatus of claim 1, wherein the wearable earpiece communicates with the mobile wireless transceiver through a first wireless communication channel of a piconet and the microphone communicates with the mobile wireless transceiver through a second wireless communication channel of the piconet, and in which the wearable earpiece and the microphone are not physically connected to each other in a wireless mode of operation.

7. An apparatus comprising:
a host device that operates as a mobile wireless transceiver to wirelessly communicate using a first communication link to send and receive signals at a radio frequency (RF), the host device including a receiver module to process inbound signals and a transmitter module to process outbound signals; and
at least one wearable earpiece, that includes a first earpiece and a second earpiece that are two separate earpieces, and a microphone that is a third separate piece, in which the three separate pieces physically attach to the host device and in which the at least one wearable earpiece and microphone detach from the host device to wirelessly communicate with the host device using a second communication link, wherein the at least one wearable earpiece and microphone include a battery for wireless operation and the battery is recharged by the host device when the at least one wearable earpiece and microphone are physically attached to the host device.

8. The apparatus of claim 7, wherein the first and second earpieces and the microphone each has a battery for wireless communications and each battery is recharged by the host device when the earpieces and the microphone are physically attached to the host device.

9. The apparatus of claim 8, wherein the first earpiece communicates with the host device through a first wireless communication channel of a piconet, the second earpiece communicates with the host device through a second wireless communication channel of the piconet and the microphone communicates with the host device through a third wireless communication channel of the piconet, and in which the two earpieces and the microphone are not physically connected to each other in a wireless mode of operation.

10. The apparatus of claim 9, wherein the second communication link operates in accordance with one or more versions of a Bluetooth specification.

11. The apparatus of claim 9, wherein a command signal is communicated between the first earpiece and the second earpiece to ensure a synchronized playback operable to support stereo signals.

12. A method comprising:
using a first communication link to wirelessly send and receive signals at a mobile wireless transceiver that operates as a host device, the host device processing inbound and outbound signals at a radio frequency (RF); and
using a second communication link to wirelessly transfer data between at least one wearable earpiece and microphone that are separate physical units, but attach to the host device, in which the at least one wearable earpiece and microphone detach from the mobile wireless transceiver to wirelessly communicate with the host device, wherein the at least one wearable earpiece and microphone each having a battery for wireless communications and each battery is recharged by the host device when the at least one wearable earpiece and microphone are physically attached to the host device.

13. The method of claim 12, wherein the at least one wearable earpiece is comprised of a first and second earpieces to operate as a stereo headset.

14. The method of claim 12, wherein using the second communication link uses a piconet.

15. The method of claim 12, wherein using the second communication link operates the second communication link in accordance with one or more versions of a Bluetooth specification.

16. The method of claim 12, wherein the at least one wearable earpiece communicates with the host device through a first wireless communication channel of a piconet and the microphone communicates with the host device through a second wireless communication channel of the piconet, and in which the at least one wearable earpiece and the microphone are not physically connected to each other in a wireless mode of operation.

17. The method of claim 12, wherein the at least one wearable earpiece is comprised of first and second earpieces that are two separate earpieces and the microphone is a third separate piece and wherein the first earpiece communicates with the host device through a first wireless communication channel of a piconet, the second earpiece communicates with the host device through a second wireless communication channel of the piconet and the microphone communicates with the host device through a third wireless communication channel of the piconet, and in which the two earpieces and the microphone are not physically connected to each other in a wireless mode of operation.

* * * * *